(12) United States Patent
Li et al.

(10) Patent No.: US 11,879,069 B2
(45) Date of Patent: Jan. 23, 2024

(54) GRAPHENE ORTHOSILICATE/SILANE COMPOSITE GEL MATERIAL, AND PREPARATION METHOD AND USE THEREOF

(71) Applicant: QINGDAO UNIVERSITY OF TECHNOLOGY, Qingdao (CN)

(72) Inventors: Shaochun Li, Qingdao (CN); Dongshuai Hou, Qingdao (CN); Yongjuan Geng, Qingdao (CN); Wenjuan Zhang, Qingdao (CN); Zuquan Jin, Qingdao (CN); Yaguang Zhu, Qingdao (CN); Youlai Zhang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 371 days.

(21) Appl. No.: 16/979,467

(22) PCT Filed: Mar. 5, 2020

(86) PCT No.: PCT/CN2020/077999
§ 371 (c)(1),
(2) Date: Nov. 18, 2020

(87) PCT Pub. No.: WO2020/244263
PCT Pub. Date: Dec. 10, 2020

(65) Prior Publication Data
US 2022/0396705 A1     Dec. 15, 2022

(30) Foreign Application Priority Data
Jun. 6, 2019   (CN) .......................... 201910491286.0

(51) Int. Cl.
| | |
|---|---|
| *C09D 7/61* | (2018.01) |
| *C09D 7/65* | (2018.01) |
| *C09D 5/08* | (2006.01) |
| *C09D 183/06* | (2006.01) |

(52) U.S. Cl.
CPC ............... *C09D 7/61* (2018.01); *C09D 5/084* (2013.01); *C09D 7/65* (2018.01); *C09D 183/06* (2013.01)

(58) Field of Classification Search
CPC ......... C08G 77/04; C08K 3/042; C08L 83/04; C09D 7/61; C09D 5/084; C09D 7/65; C09D 183/06; C09D 7/63; C09D 7/69; C09D 4/00; C09D 5/08; C09D 183/04
See application file for complete search history.

(56) References Cited

FOREIGN PATENT DOCUMENTS

| | | |
|---|---|---|
| CN | 104860304 A | 8/2015 |
| CN | 107022080 A | 8/2017 |
| CN | 107699130 A | 2/2018 |
| CN | 108217632 A | 6/2018 |
| CN | 108218386 A | 6/2018 |
| CN | 109251660 A | 1/2019 |
| CN | 110183963 A | 8/2019 |
| CN | 110204244 A | 9/2019 |

OTHER PUBLICATIONS

International Search Report for PCT/CN2020/077999 dated Jun. 4, 2020 (p. 2).

*Primary Examiner* — Anthony J Green
(74) *Attorney, Agent, or Firm* — QUANTUM PATENT LAW FIRM; Seongyoune Kang

(57) ABSTRACT

The present invention provides a graphene oxide-tetraethyl orthosilicate (TEOS)/silane composite gel material, and a preparation method and use thereof, and belongs to the technical field of building surface coating. The graphene oxide-TEOS/silane composite gel material provided by the present invention includes the following components: 5-45 parts by weight of graphene oxide dispersion, 30-90 parts by weight of TEOS, 30-80 parts by weight of silane, 1-5 parts by weight of emulsifier, and 1-5 parts by weight of dispersant; the graphene oxide dispersion has a concentration of 0.5-5%. The graphene oxide-TEOS/silane composite gel material provided by the invention can form a hydrophobic anticorrosive coating after coating the surface of a cement-based material, and has excellent water resistance and corrosion resistance.

17 Claims, No Drawings

GRAPHENE ORTHOSILICATE/SILANE COMPOSITE GEL MATERIAL, AND PREPARATION METHOD AND USE THEREOF

CROSS-REFERENCE TO RELATED APPLICATIONS

This application is a U.S. national stage application of International Application No. PCT/CN2020/077999, filed Mar. 5, 2020 and the entire contents of which are incorporated herein by reference, which claims priority to Chinese Patent Application No. CN201910491286.0, filed Jun. 6, 2019, the entire contents of which are incorporated herein by reference.

TECHNICAL FIELD

The present invention relates to the technical field of building surface coating, and in particular to a graphene oxide-tetraethyl orthosilicate (TEOS)/silane composite gel material, and a preparation method and use thereof.

BACKGROUND

Building exterior surface coating is one of the important measures to improve building durability. At present, there are two commonly used building exterior surface coatings in general: surface coated type and surface permeable type.

Surface coated coating is a layer of covered type coating formed on the exterior surface of a building. The coating seals holes and cracks on the building surface, preventing water and erosive substances from entering the interior of a building material; however, the coating further blocks water evaporation from the interior of the building material, and usually causes blistering, cracking, etc. on the coating surface, influencing the appearance and durability of the building.

Surface permeable coating can permeate to 3-5 mm away from the interior of the building material, where a hydrophobic coating is formed. Therefore, the coating has no influence on the appearance of the building and is taken seriously by engineers. However, the surface permeable coating is difficult to prevent water from passing through surface cracks of the building material into the interior thereof, and such coating has poor corrosion resistance.

SUMMARY

In view of this, an objective of the present invention is to provide a graphene oxide-TEOS/silane composite gel material, and a preparation method and use thereof, and the graphene oxide-TEOS/silane composite gel material provided by the invention has excellent water resistance and corrosion resistance.

To achieve the above objective, the present invention provides the following technical solutions.

A graphene oxide-tetraethyl orthosilicate (TEOS)/silane composite gel material includes the following components: 5-45 parts by weight of graphene oxide dispersion, 30-90 parts by weight of TEOS, 30-80 parts by weight of silane, 1-5 parts by weight of emulsifier, and 1-5 parts by weight of dispersant; the graphene oxide dispersion has a concentration of 0.5-5%.

Preferably, the graphene oxide in the graphene oxide dispersion has a particle size of 3-8 μm.

Preferably, the silane is one or more of methyltrimethoxysilane (MTMS), methyltriethoxysilane (MTES), vinyltrimethoxysilane (VTMS), triethoxyvinylsilane (TEVS), isobutyl(trimethoxy)silane, triethoxy(isobutyl)silane, trimethoxy(octyl)silane (TMOS), and octyltriethoxysilane (OTEOS).

Preferably, the dispersant is one or more of sodium dodecylbenzenesulfonate (SDBS), polyvinyl alcohol (PVA), polyethylene glycol (PEG), and glycerol.

Preferably, the emulsifier is one or more of Span 80, Peregal O, and Tween.

A method for preparing the graphene oxide-TEOS/silane composite gel material includes the following steps:
(1) mixing a graphene oxide dispersion with a dispersant to obtain a first mixture;
(2) mixing a silane with an emulsifier to obtain a second mixture; and
(3) mixing the first mixture with the second mixture, and adding TEOS, to obtain the graphene oxide-TEOS/silane composite gel material;
where there is no time sequence between steps (1) and (2).

Preferably, the mixing in step (3) is conducted at a constant temperature.

Preferably, the mixing in step (3) is conducted for 2-3 h at 50-80° C.

Preferably, step (3) is as follows: dropping the first mixture to the second mixture or dropping the second mixture to the first mixture to obtain a mixture, followed by dropping TEOS to the mixture.

The present invention further provides use of the above graphene oxide-TEOS/silane composite gel material or a graphene oxide-TEOS/silane composite gel material prepared by the above preparation method in building coating.

The present invention provides a graphene oxide-TEOS/silane composite gel material, including the following components: 5-45 parts by weight of graphene oxide dispersion, 30-90 parts by weight of TEOS, 30-80 parts by weight of silane, 1-5 parts by weight of emulsifier, and 1-5 parts by weight of dispersant; the graphene oxide dispersion has a concentration of 0.5-5%. Through a lamellar structure of the graphene oxide, the present invention prevents external water and corrosive ions from entering the interior of concrete; moreover, there are abundant functional groups on the surface of the graphene oxide, such as hydroxyl group, carboxyl group, etc., which firmly adsorb on the concrete surface through chemical reactions; these functional groups provides templates for secondary hydration reaction of the concrete, optimize the surface structure thereof, increase surface density, and improve surface strength, water resistance and corrosion resistance. Meanwhile, hydrolyzed TEOS forms a gel easily, making the product of the present invention change from a solution state to a gel state; nano silica ($SiO_2$) formed by hydrolysis of TEOS is subjected to secondary hydration reaction with cement hydration product $Ca(OH)_2$ on the concrete surface to form a C—S—H gel, improving the microstructure and density of the concrete surface and further enhancing the water resistance and corrosion resistance of the product.

Results of examples indicate that: after the graphene oxide-TEOS/silane composite gel material provided by the present invention is coated on the surface of a cement-based material, a static contact angle between the cement-based material and water is 118-128°, a water absorption coefficient by capillarity is 30.2-55.1 $g \cdot m^{-2} \cdot h^{-1}$, and a chloride diffusion coefficient is $1.0 \times 10^{-12}$-$3.5 \times 10^{-12}$ $m^2 \cdot s^{-1}$; in contrast, in examples, a static contact angle between uncoated cement-based material and water is 50-60°, a water absorption coefficient by capillarity is 118.6 $g \cdot m^{-2} \cdot h^{-1}$, and a chloride diffusion coefficient is $7.5 \times 10^{-12}$ $m^2 \cdot s^{-1}$, indicating that the graphene oxide-TEOS/silane composite gel material provided by the present invention has water resistance and corrosion resistance after a coating is formed on the surface of the cement-based material.

DETAILED DESCRIPTION

The present invention provides a graphene oxide-TEOS/silane composite gel material, including the following components: 5-45 parts by weight of graphene oxide dispersion, 30-90 parts by weight of TEOS, 30-80 parts by weight of silane, 1-5 parts by weight of emulsifier, and 1-5 parts by weight of dispersant; the graphene oxide dispersion has a concentration of 0.5-5%.

The graphene oxide-TEOS/silane composite gel material provided by the present invention includes 5-45 parts by weight, more preferably 5-40 parts by weight, and most preferably 15-40 parts by weight of graphene oxide dispersion.

In the present invention, the graphene oxide in the graphene oxide dispersion preferably has a particle size of 3-8 μm and more preferably 5 m; the graphene oxide dispersion preferably has a concentration of 0.5-5%, and more preferably 1%. Sources of the graphene oxide dispersion are not particularly limited in the present invention, as long as commercially available products used are well known to those skilled in the art. In the present invention, the graphene oxide has a lamellar structure that prevents external water and corrosive ions from entering the interior of concrete. Moreover, there are abundant functional groups on the surface of the graphene oxide, such as hydroxyl group, carboxyl group, etc., which firmly adsorb on the concrete surface through chemical reactions; these functional groups provides templates for secondary hydration reaction of the concrete, optimize the surface structure thereof, increase surface density, and improve surface strength, water resistance and corrosion resistance. However, as graphene oxide content increases, the stability of a composite gel material will suddenly change when the graphene oxide content exceeds 45 parts by weight, influencing the stability of the composite gel material; stratification will occur immediately after reaction.

With reference to the part by weight of graphene oxide dispersion, the graphene oxide-TEOS/silane composite gel material provided by the present invention includes 30-90 parts by weight, more preferably 30-60 parts by weight, and most preferably 40-55 parts by weight of TEOS. Sources of the TEOS are not particularly limited in the present invention, as long as commercially available products used are well known to those skilled in the art. In the present invention, the TEOS is hydrolyzed to form a gel easily, making the product of the present invention change from a solution to a gel; nano $SiO_2$ formed by hydrolysis of TEOS is subjected to secondary hydration reaction with cement hydration product $Ca(OH)_2$ on the concrete surface to form a C—S—H gel, improving the microstructure and density of the concrete surface and further enhancing the water resistance and corrosion resistance of the product.

With reference to the part by weight of graphene oxide dispersion, the graphene oxide-TEOS/silane composite gel material provided by the present invention includes 30-80 parts by weight, more preferably 35-70 parts by weight, and most preferably 40-60 parts by weight of silane.

In the present invention, the silane is preferably one or more of methyltrimethoxysilane (MTMS), methyltriethoxysilane (MTES), vinyltrimethoxysilane (VTMS), triethoxyvinylsilane (TEVS), isobutyl(trimethoxy)silane, triethoxy(isobutyl)silane, trimethoxy(octyl)silane (TMOS), and octyltriethoxysilane (OTEOS). Sources of the silane are not particularly limited in the present invention, as long as silanes used, particularly commercially available products, are well known to those skilled in the art. In the present invention, the silane has low surface energy and can modify the concrete surface to obtain a surface with strong hydrophobicity, thereby inhibiting the adsorption of water on the concrete surface and enhancing water resistance and corrosion resistance.

With reference to the part by weight of graphene oxide dispersion, the graphene oxide-TEOS/silane composite gel material provided by the present invention includes 1-5 parts by weight and more preferably 2-4 parts by weight of dispersant. In the present invention, the dispersant is preferably one or more of sodium dodecylbenzenesulfonate (SDBS), polyvinyl alcohol (PVA), polyethylene glycol (PEG), and glycerol. In the present invention, the PEG preferably has a number average molecular weight of 2,000. Sources of the dispersant are not particularly limited in the present invention, as long as dispersants used are well known to those skilled in the art.

With reference to the part by weight of graphene oxide dispersion, the graphene oxide-TEOS/silane composite gel material provided by the present invention includes 1-5 parts by weight and more preferably 2-4 parts by weight of emulsifier. In the present invention, the emulsifier is preferably one or more of Span 80, Peregal O, and Tween. Sources of the emulsifier are not particularly limited in the present invention, as long as emulsifiers used are well known to those skilled in the art.

The present invention further provides a method for preparing the graphene oxide-TEOS/silane composite gel material according to the above technical solution, including the following steps:

(1) mixing a graphene oxide dispersion with a dispersant to obtain a first mixture;

(2) mixing a silane with an emulsifier to obtain a second mixture; and (3) mixing the first mixture with the second mixture, and adding TEOS, to obtain the graphene oxide-TEOS/silane composite gel material;

where there is no time sequence between steps (1) and (2).

The present invention mixes a graphene oxide dispersion with a dispersant to obtain a first mixture.

In the present invention, the mixing is preferably conducted at a constant temperature, and the mixing temperature is preferably 40-70° C., and more preferably 50° C. In the present invention, the mixing is preferably conducted by stirring; the stirring rate and time are not particularly limited in the present invention, as long as a well-mixed first mixture can be obtained.

The present invention mixes a silane with an emulsifier to obtain a second mixture.

In the present invention, the mixing is preferably conducted at a constant temperature, and the mixing temperature is preferably 40-70° C., and more preferably 50° C. In the present invention, the mixing is preferably conducted by stirring; the stirring and mixing rate and time are not particularly limited in the present invention, as long as a well-mixed first mixture can be obtained.

In the present invention, no time sequence is required for preparation of the first and second mixtures. Whether the present invention first prepares the first mixture or the second mixture has no effect on preparation of the graphene oxide-TEOS/silane composite gel material.

After the first and second mixtures, the present invention mixes the first mixture with the second mixture, and adds TEOS, to obtain the graphene oxide-TEOS/silane composite gel material.

In the present invention, the mixing is preferably conducted at a constant temperature, and the mixing temperature is preferably 50-80° C., and more preferably 55° C. In the present invention, the second mixture is preferably allowed to stand for 24 h before mixing the first and second mixtures; the standing is preferably conducted at a constant temperature, and the standing temperature is preferably 40-70° C., and more preferably 50° C. In the present invention, the standing can make the second mixture more uniform.

In the present invention, the mixing is preferably conducted under stirring; the stirring rate is preferably 2,000-5,000 r/min, and more preferably 3,000-4,000 r/min. The stirring time is not particularly limited in the present invention, as long as the mixture can be mixed well.

Dropping is preferably adopted in the present invention, i.e., dropping the first mixture to the second mixture or dropping the second mixture to the first mixture. In the present invention, the dropping speed is preferably 2-10 ml/min, and more preferably 5 ml/min. In the present invention, the dropping is conducive to full and uniform reaction of the silane with the graphene oxide, so that the hydroxyl or carboxyl group carried by the graphene oxide is condensed with an alkoxy group on the silane molecular group to link together, avoiding uneven products caused by local rapid reaction.

After the mixing is completed, TEOS is preferably added to the first mixture and the second mixture which are evenly mixed. In the present invention, the dropping speed is preferably 2-10 ml/min, and more preferably 5 ml/min.

The present invention further provides use of the graphene oxide-TEOS/silane composite gel material according to the above technical solution in building coating. Implementation of the use is not particularly limited in the present invention, as long as the implementation used is well known to those skilled in the art. In the present invention, the use is preferably as follows: coating the graphene oxide-TEOS/silane composite gel material on the surface of a building matrix 2-5 times, with a single amount of 200-300 g/m$^2$; after coating, covering a plastic film on the surface of the building matrix for 3-7 days, and removing the plastic film to obtain a coating with water resistance and corrosion resistance. The coating method is not particularly limited in the present invention, as long as the coating method used is well known to those skilled in the art, specifically, for example, roll coating.

The graphene oxide-TEOS/silane composite gel material, and a preparation method and the use thereof provided by the present invention will be described in detail below in conjunction with the examples, but they should not be construed as limiting the scope of the invention.

Example 1

25 parts by weight of graphene oxide dispersion (concentration, 1%; particle size, 5 m) and two parts by weight of PEG 2000 were stirred and mixed at 50° C. to form a first mixture.

65 parts of triethoxy(isobutyl)silane, two parts by weight of Span 80 and three parts by weight of Peregal O were stirred and mixed at 60° C. to form a second mixture. The second mixture was allowed to stand for 24 h at 60° C.; then the second mixture was dropped into the first mixture at 3,000 r/min and 60° C. The dropping speed was 5 ml/min. After stirring for 2.5 h, 60 parts by weight of TEOS was dropped into a mixture of both to obtain a graphene oxide-TEOS/silane composite gel material.

The graphene oxide-TEOS/silane composite gel material was roll-coated twice on the surface of a concrete matrix, with a total coating amount of 600 g/m$^2$. After coating, a plastic film was covered on the surface of the matrix and uncovered seven days after covering. The test results showed that the concrete had a surface contact angle of up to 1280, a water absorption coefficient by capillarity of 30.2 g·m$^{-2}$·h$^{-1}$, and a chloride diffusion coefficient of $1.0 \times 10^{-12}$ m$^2$·s$^{-1}$.

Example 2

35 parts by weight of graphene oxide dispersion (concentration, 1%; particle size, 5 m) and three parts by weight of PVA were stirred and mixed at 50° C. to form a first mixture.

50 parts of MTMS, three parts by weight of Tween and two parts by weight of Peregal O were stirred and mixed at 60° C. to form a second mixture. The second mixture was allowed to stand for 24 h at 60° C.; then the second mixture was dropped into the first mixture at 3,000 r/min and 60° C. The dropping speed was 8 ml/min. After stirring for 2 h, 50 parts by weight of TEOS was dropped into a mixture of both to obtain a graphene oxide-TEOS/silane composite gel material.

The graphene oxide-TEOS/silane composite gel material was roll-coated twice on the surface of a concrete matrix, with a total coating amount of 600 g/m$^2$. After coating, a plastic film was covered on the surface of the matrix and uncovered seven days after covering. The test results showed that the concrete had a surface contact angle of up to 120°, a water absorption coefficient by capillarity of 52.3 g·m$^{-2}$·h$^{-1}$, and a chloride diffusion coefficient of $2.5 \times 10^{-12}$ m$^2$·s$^{-1}$.

Example 3

40 parts by weight of graphene oxide dispersion (concentration, 2%; particle size, 8 m), two parts by weight of PVA, and two parts by weight of PEG were stirred and mixed at 50° C. to form a first mixture.

60 parts of isobutyl(trimethoxy)silane, two parts by weight of Tween and three parts by weight of Span 80 were stirred and mixed at 60° C. to form a second mixture. The second mixture was allowed to stand for 24 h at 60° C.; then the second mixture was dropped into the first mixture at 3,000 r/min and 60° C. The dropping speed was 4 ml/min. After stirring for 3 h, 40 parts by weight of TEOS was dropped into a mixture of both to obtain a graphene oxide-TEOS/silane composite gel material.

The graphene oxide-TEOS/silane composite gel material was roll-coated twice on the surface of a concrete matrix, with a total coating amount of 600 g/m$^2$. After coating, a plastic film was covered on the surface of the matrix and uncovered seven days after covering. The test results showed that the concrete had a surface contact angle of up to 118°, a water absorption coefficient by capillarity of 55.1 g·m$^{-2}$·h$^{-1}$, and a chloride diffusion coefficient of $3.5 \times 10^{-12}$ m$^2$·s$^{-1}$.

Example 4

45 parts by weight of graphene oxide dispersion (concentration, 0.5%; particle size, 4 m), two parts by weight of glycerol and two parts by weight of PVA were stirred and mixed at 50° C. to form a first mixture.

60 parts of isobutyl(trimethoxy)silane, 20 parts by weight of MTES, 30 parts by weight of triethoxy(isobutyl)silane, two parts by weight of Span 80 and two parts by weight of Peregal O were stirred and mixed at 60° C. to form a second mixture. The second mixture was allowed to stand for 24 h at 60° C.; then the second mixture was dropped into the first mixture at 3,000 r/min and 60° C. The dropping speed was 5 ml/min. After stirring for 2.5 h, 80 parts by weight of TEOS was dropped into a mixture of both to obtain a graphene oxide-TEOS/silane composite gel material.

The graphene oxide-TEOS/silane composite gel material was roll-coated twice on the surface of a concrete matrix, with a total coating amount of 600 g/m$^2$. After coating, a plastic film was covered on the surface of the matrix and uncovered seven days after covering. The test results showed that the concrete had a surface contact angle of up to 110°, a water absorption coefficient by capillarity of 45.6 g·m$^{-2}$·h$^{-1}$, and a chloride diffusion coefficient of $1.5\times10^{-12}$ m$^2$·s$^1$.

Example 5

20 parts by weight of graphene oxide dispersion (concentration, 5%; particle size, 6 m), one part by weight of glycerol and two parts by weight of PEG were stirred and mixed at 50° C. to form a first mixture.

15 parts of VTMS, 20 parts by weight of MTES, 15 parts by weight of triethoxy(isobutyl)silane, one part by weight of Span 80 and two parts by weight of Tween were stirred and mixed at 60° C. to form a second mixture. The second mixture was allowed to stand for 24 h at 60° C.; then the second mixture was dropped into the first mixture at 3,000 r/min and 60° C. The dropping speed was 5 ml/min. After stirring for 2.5 h, 30 parts by weight of TEOS was dropped into a mixture of both to obtain a graphene oxide-TEOS/silane composite gel material.

The graphene oxide-TEOS/silane composite gel material was roll-coated twice on the surface of a concrete matrix, with a total coating amount of 600 g/m$^2$. After coating, a plastic film was covered on the surface of the matrix and uncovered seven days after covering. The test results showed that the concrete had a surface contact angle of up to 112°, a water absorption coefficient by capillarity of 36.5 g·m$^{-2}$·h$^{-1}$, and a chloride diffusion coefficient of $2.3\times10^{12}$ m$^2$·s$^{-1}$.

Example 6

10 parts by weight of graphene oxide dispersion (concentration, 3%; particle size, 7 μm), one part by weight of glycerol and two parts by weight of PEG were stirred and mixed at 50° C. to form a first mixture.

25 parts of MTES, 15 parts by weight of MTMS, 20 parts by weight of OTEOS, three parts by weight of Span 80 and two parts by weight of Tween were stirred and mixed at 60° C. to form a second mixture. The second mixture was allowed to stand for 24 h at 60° C.; then the second mixture was dropped into the first mixture at 3,000 r/min and 60° C. The dropping speed was 5 ml/min. After stirring for 2.5 h, 70 parts by weight of TEOS was dropped into a mixture of both to obtain a graphene oxide-TEOS/silane composite gel material.

The graphene oxide-TEOS/silane composite gel material was roll-coated twice on the surface of a concrete matrix, with a total coating amount of 600 g/m$^2$. After coating, a plastic film was covered on the surface of the matrix and uncovered seven days after covering. The test results showed that the concrete had a surface contact angle of up to 125°, a water absorption coefficient by capillarity of 50.6 g·m$^{-2}$·h$^{-1}$, and a chloride diffusion coefficient of $2.8\times10^{-12}$ m$^2$·s$^{-1}$.

Comparative Example 1

Performance test results of an uncoated cement-based material showed that the uncoated cement-based material had a water absorption coefficient by capillarity of up to 118.6 g·m$^{-2}$·h$^{-1}$, a static contact angle of water of 50-60°, and a chloride diffusion coefficient of $7.5\times10^{-11}$ m$^2$·s$^{-1}$.

According to the above examples and the comparative example, after the graphene oxide-TEOS/silane composite gel material provided by the present invention is coated on the surface of the cement-based material, the water absorption coefficient by capillarity of the cement-based material is 30.2-55.1 g·m$^{-2}$·h$^{-1}$, and that of the uncoated cement-based material is as high as 118.6 g·m$^{-2}$·h$^{-1}$; the static contact angle of the present invention to water is 118-128°, while the static contact angle of the uncoated cement-based material is only 50-60°; the chloride ion diffusion coefficient of the cement-based material provided by the invention is $1\times10^{-12}$-$3.5\times10^{-12}$ m$^2$·s$^{-1}$, while that of the same uncoated cement-based material is $7.5\times10^{-11}$ m$^2$·s$^{-1}$, indicating that the graphene oxide-TEOS/silane composite gel material provided by the present invention can prevent water from entering the interior of a building material through cracks on the surface thereof after the coating is formed on the surface of the cement-based material, water resistance and corrosion resistance.

The description of the above examples is only intended to assist in understanding the methods and the core concepts of the present invention. It should be noted that improvements or modifications may also be made by those of ordinary skill in the art without departing from the spirit of the invention and come within the scope of these claims. A plurality of amendments to these examples are apparent to those skilled in the art, and general principles defined in this application can be achieved in the other examples without departing from the spirit or scope of the present invention. Thus, the present invention will be not limited to these examples shown in this application, but shall accord with the widest scope consistent with the principles and novel characteristics disclosed by this application.

What is claimed is:

1. A graphene oxide-tetraethyl orthosilicate (TEOS)/silane composite gel material, comprising:
   5-45 parts by weight of graphene oxide dispersion;
   30-90 parts by weight of TEOS;
   30-80 parts by weight of silane; and
   1-5 parts by weight of emulsifier, and 1-5 parts by weight of dispersant,
   wherein the graphene oxide dispersion has a concentration of 0.5-5%.

2. The graphene oxide-TEOS/silane composite gel material according to claim 1, wherein the graphene oxide in the graphene oxide dispersion has a particle size of 3-8 μm.

3. The graphene oxide-TEOS/silane composite gel material according to claim 1, wherein the silane is one or more of methyltrimethoxysilane (MTMS), methyltriethoxysilane (MTES), vinyltrimethoxysilane (VTMS), triethoxyvinylsilane (TEVS), isobutyl(trimethoxy)silane, triethoxy(isobutyl)silane, trimethoxy(octyl)silane (TMOS), and octyltriethoxysilane (OTEOS).

4. The graphene oxide-TEOS/silane composite gel material according to claim 1, wherein the dispersant is one or more of sodium dodecylbenzenesulfonate (SDBS), polyvinyl alcohol (PVA), polyethylene glycol (PEG), and glycerol.

5. A method for preparing the graphene oxide-TEOS/silane composite gel material according to claim 1, comprising:
   mixing a graphene oxide dispersion with a dispersant to obtain a first mixture;
   mixing a silane with an emulsifier to obtain a second mixture; and
   mixing the first mixture with the second mixture, and adding TEOS, to obtain the graphene oxide-TEOS/silane composite gel material;
   wherein there is no time sequence between the mixing of the graphene oxide dispersion with the dispersant and the mixing of the silane with the emulsifier.

6. The preparation method according to claim 5, wherein the mixing of the first mixture with the second mixture is conducted at a constant temperature.

7. The preparation method according to claim 5, wherein the mixing of the first mixture with the second mixture is conducted for 2-3 h at 50-80° C.

8. The preparation method according to claim 5, wherein the mixing of the first mixture with the second mixture comprises: dropping the first mixture to the second mixture or dropping the second mixture to the first mixture to obtain a mixture, followed by dropping TEOS to the mixture.

9. The preparation method according to claim 6, wherein the mixing of the graphene oxide dispersion with the dispersant and the mixing of the silane with the emulsifier is conducted for 2-3 h at 50-80° C.

10. A method for preparing the graphene oxide-TEOS/silane composite gel material according to claim 2, comprising the following steps:
    mixing a graphene oxide dispersion with a dispersant to obtain a first mixture;
    mixing a silane with an emulsifier to obtain a second mixture; and
    mixing the first mixture with the second mixture, and adding TEOS, to obtain the graphene oxide-TEOS/silane composite gel material;
    wherein there is no time sequence between the mixing of the graphene oxide dispersion with the dispersant and the mixing of the silane with the emulsifier.

11. The preparation method according to claim 10, wherein the mixing of the graphene oxide dispersion with the dispersant and the mixing of the silane with the emulsifier is conducted at a constant temperature.

12. The preparation method according to claim 10, wherein the mixing of the graphene oxide dispersion with the dispersant and the mixing of the silane with the emulsifier is conducted for 2-3 h at 50-80° C.

13. A method for preparing the graphene oxide-TEOS/silane composite gel material according to claim 3, comprising:
    mixing a graphene oxide dispersion with a dispersant to obtain a first mixture;
    mixing a silane with an emulsifier to obtain a second mixture; and
    mixing the first mixture with the second mixture, and adding TEOS, to obtain the graphene oxide-TEOS/silane composite gel material;
    wherein there is no time sequence between the mixing of the graphene oxide dispersion with the dispersant and the mixing of the silane with the emulsifier.

14. The preparation method according to claim 13, wherein the mixing of the graphene oxide dispersion with the dispersant and the mixing of the silane with the emulsifier is conducted at a constant temperature.

15. The preparation method according to claim 13, wherein the mixing of the graphene oxide dispersion with the dispersant and the mixing of the silane with the emulsifier is conducted for 2-3 h at 50-80° C.

16. A method for preparing the graphene oxide-TEOS/silane composite gel material according to claim 4, comprising:
    mixing a graphene oxide dispersion with a dispersant to obtain a first mixture;
    mixing a silane with an emulsifier to obtain a second mixture; and
    mixing the first mixture with the second mixture, and adding TEOS, to obtain the graphene oxide-TEOS/silane composite gel material;
    wherein there is no time sequence between the mixing of the graphene oxide dispersion with the dispersant and the mixing of the silane with the emulsifier.

17. The preparation method according to claim 16, wherein the mixing of the graphene oxide dispersion with the dispersant and the mixing of the silane with the emulsifier is conducted at a constant temperature.

* * * * *